US008764533B2

(12) United States Patent  
Ohara et al.

(10) Patent No.: US 8,764,533 B2  
(45) Date of Patent: Jul. 1, 2014

(54) USER INTERFACE PROCESSING APPARATUS, METHOD, AND MEDIUM FOR SELECTING AN OBJECT IN AN APPLICATION

(75) Inventors: Takashi Ohara, Tokyo (JP); Hisatoshi Ohno, Chiba (JP); Takehiro Ando, Tokyo (JP); Hidetoshi Aoyagi, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 0 days.

(21) Appl. No.: 12/954,993

(22) Filed: Nov. 29, 2010

(65) Prior Publication Data

US 2011/0250966 A1 Oct. 13, 2011

(30) Foreign Application Priority Data

Dec. 1, 2009 (JP) ................................. 2009-273746

(51) Int. Cl.  
*G06F 17/00* (2006.01)

(52) U.S. Cl.  
USPC ............ 463/9; 463/7; 463/8; 463/30; 463/31; 463/36

(58) Field of Classification Search  
USPC ............................................ 463/6–8, 30–33  
See application file for complete search history.

(56) References Cited

U.S. PATENT DOCUMENTS

| 2002/0004421 | A1 | 1/2002 | Itai |
| 2004/0119733 | A1 | 6/2004 | Morimoto et al. |
| 2007/0078005 | A1* | 4/2007 | Shiraiwa ........................ 463/43 |
| 2007/0197289 | A1* | 8/2007 | Fujimoto et al. ................. 463/32 |
| 2007/0265045 | A1* | 11/2007 | Takai ................................. 463/8 |
| 2008/0153601 | A1* | 6/2008 | Tahara et al. ................... 463/43 |
| 2009/0278809 | A1 | 11/2009 | Ohsawa |

FOREIGN PATENT DOCUMENTS

| JP | 2001-092580 | 4/2001 |
| JP | 2005-052476 | 3/2005 |
| JP | 2005-266850 | 9/2005 |
| JP | 2005-322088 | 11/2005 |
| JP | 2008-276277 | 11/2008 |

(Continued)

OTHER PUBLICATIONS

Enchanted Arms Game Manual, Ubisoft, Aug. 2006, <http://www.meekeo.com/Xbox-360-manuals_enchanted-arms>.*

(Continued)

*Primary Examiner* — Ronald Laneau  
*Assistant Examiner* — Justin Myhr  
(74) *Attorney, Agent, or Firm* — Greenblum & Bernstein, P.L.C.

(57) ABSTRACT

Spotlight information that contains at least coordinate information indicating a coordinate at which an object is positioned is generated in accordance with a selection operation for selecting the object. A spotlight screen, including a spotlight illuminating region for receiving an operation input and a darkened region for receiving a request to cancel the selection operation, is displayed in accordance with the generated spotlight information. The received selection operation is determined in a case where a selection of the spotlight illuminating region is received. A predetermined region having its center at a coordinate at which the object is positioned is determined as the spotlight illuminating region. A predetermined region including a coordinate on which an object, for which the selection operation is not received, exists is determined as the darkened region in a case where there is the object within the spotlight illuminating region.

20 Claims, 6 Drawing Sheets

(56) References Cited

FOREIGN PATENT DOCUMENTS

| | | |
|---|---|---|
| JP | 2009-211641 | 9/2009 |
| JP | 2009-276829 | 11/2009 |
| WO | 2008/126129 | 10/2008 |

OTHER PUBLICATIONS

Enchanted Arms Battle System Video, GameTrailers, <http://www.gametrailers.com/video/combat-gameplay-enchanted-arms/12335>.*

Jeanne D' Arc Videogame, Sony Computer Entertainment, Aug. 21, 2007 Walkthrough: IGN,<http://www.ign.com/faqs/2008/jeanne-darc-walkthrough-pdf-848022> Video:Metacritic,<http://www.metacritic.com/game/psp/jeanne-darc/trailers>, Time 1:19-1:30.*

JP Office Action in JP 2009-273746, dated Dec. 6, 2011, along with an English language translation thereof.

"Perfect World Kanbi Sekai, Game wo Hajimetekara", C&C Media Co., URL://pw.mk-style.com/beginners_guide/hunt/, Apr. 9, 2007, pp. 1-3, along with an English language translation thereof.

Extended European Search Report from E.P.O. in EP Application No. 10193279, mail date is May 29, 2012.

* cited by examiner

FIG. 2

SPOTLIGHT INFORMATION MANAGING TABLE

| CENTRAL COORDINATE | SHAPE OF ILLUMINATING REGION | METHOD OF DETERMINING DARKENED REGION | LUMINOUS INTENSITY | ... |
|---|---|---|---|---|
| (x, y, z) | CIRCLE WITH RADIUS R | GAME SCREEN OTHER THAN ILLUMINATING REGION | ILLUMINATING REGION:⋯ DARKENED REGION:⋯ | ... |

USER INTERFACE PROCESSING APPARATUS, METHOD, AND MEDIUM FOR SELECTING AN OBJECT IN AN APPLICATION

CROSS-REFERENCE TO RELATED APPLICATION

The present application relates to subject matter contained in Japanese Patent Application No. 2009-273746, filed on Dec. 1, 2009, the disclosure of which is expressly incorporated herein by reference in its entirety.

BACKGROUND OF THE INVENTION

1. Field of the Invention

The present invention relates to technique for a user interface applied to a device for carrying out control of various kinds of applications such as video games, for example.

2. Description of the Related Art

Heretofore, various kinds of video games such as a video game called an RPG (role-playing game: a game in which a player plays a role of a character in a world of the game, and accomplishes a predetermined object while enjoying a process that the character grows through various experiences), a simulation game and the like have been provided.

In recent years, as such video games, various kinds of video games, which allow a player to intuitively carry out various kinds of operations using a touch panel or the like, have been proposed. As such a video game, for example, Japanese Patent Application Publication No. 2009-276829 teaches a video game in which a touch-on operation (i.e., an operation of touching a touch panel with a finger or a pen) is received from a player by displaying a game screen or outputting music for teaching the preset timing and types of input, and thereby effects according to the timing of the received operation input and the like are executed.

However, in such a conventional video game, there has been a problem that a wrong operation by a player is induced in a case where the player (or user) wants to display plural operable objects on a game screen displayed in a display device. Namely, there has been a problem that a selection of the operable object that the player does not intend to select is received in a case where the plural operable objects are closely displayed, for example.

Here, in order to solve such a problem, a method of displaying a dialog box on a display screen and receiving an operation of the player using the displayed dialog box may also be thought. However, if the dialog box is frequently displayed, the dialog box itself is burdensome for the player, and this can become a factor to disturb progress of the operation.

In this regard, the problem as described above is not limited to the video game, and various other applications also have the similar problems.

SUMMARY OF THE INVENTION

The present invention has been made in order to solve the problem described above, and it is an object of the present invention to accurately receive intention of a player by a simple operation without disturbing a flow of operation on an application such as an operation of a video game.

In order to achieve the above object, in one aspect of the present invention, the present invention is directed to a user interface processing apparatus according to the present invention. The user interface processing apparatus according to the present invention includes an object selecting operation receiver that receives a selection operation for selecting an object.

The user interface processing apparatus also includes a spotlight information generator that generates spotlight information in accordance with the selection operation received by the object selecting operation receiver, the spotlight information containing at least coordinate information indicating a coordinate at which the object is positioned.

The user interface processing apparatus also includes a spotlight screen display controller that displays a spotlight screen in accordance with the spotlight information generated by the spotlight information generator, the spotlight screen including a spotlight illuminating region for receiving an operation input and a darkened region for receiving a request to cancel the selection operation.

By configuring the user interface processing apparatus in this manner as described above, it becomes possible to accurately receive intention of a player by a simple operation without disturbing a flow of operation on an application such as an operation of a video game.

In the user interface processing apparatus according to the present invention, it is preferable that the object selecting operation receiver determines the selection operation received by the object selecting operation receiver in a case where a selection of the spotlight illuminating region is received.

In the user interface processing apparatus according to the present invention, it is preferable that the object selecting operation receiver receives the selection operation in accordance with a contact position on a touch panel.

In the user interface processing apparatus according to the present invention, it is preferable that the spotlight information generator determines a predetermined region the center of which is a coordinate at which the object is positioned as the spotlight illuminating region.

In the user interface processing apparatus according to the present invention, it is preferable that, in a case where there is another object, for which the selection operation is not received, in the spotlight illuminating region, the spotlight information generator determines another predetermined region including a coordinate on which the another object exists as the darkened region.

In the user interface processing apparatus according to the present invention, it is preferable that the user interface processing apparatus is a video game processing apparatus for controlling progress of a video game, wherein the object selecting operation receiver receives an operation for selecting an object that becomes an action target of a player character in the video game.

In the user interface processing apparatus according to the present invention, it is preferable that the spotlight information generator includes a central coordinate specifier that specifies a central coordinate between the player character and the object for which the selection operation is received by the object selecting operation receiver in a virtual space of the video game, wherein the spotlight information generator determines a predetermined region including the player character and the object as the spotlight illuminating region using the central coordinate specified by the central coordinate specifier.

In the user interface processing apparatus according to the present invention, it is preferable that, in a case where the player character is separated from the object for which the selection operation is received by the object selecting operation receiver by more than a predetermined distance, the spotlight information generator determines each of a predetermined region including a coordinate at which the player character is positioned and another predetermined region including a coordinate at which the object is positioned as the spotlight illuminating region.

Further, in another aspect of the present invention, the present invention is directed to a method of processing a user interface according to the present invention. The user interface processing method according to the present invention includes receiving a selection operation for selecting an object.

The user interface processing method includes generating spotlight information in accordance with the selection operation received in the receiving a selection operation, the spotlight information containing at least coordinate information indicating a coordinate at which the object is positioned.

The user interface processing method also includes displaying a spotlight screen in accordance with the spotlight information generated in the generating spotlight information, the spotlight screen including a spotlight illuminating region for receiving an operation input and a darkened region for receiving a request to cancel the selection operation.

Moreover, in still another aspect of the present invention, the present invention is directed to a computer program product for processing a user interface. The computer program product according to the present invention causes a computer to execute steps including receiving a selection operation for selecting an object.

The steps also include generating spotlight information in accordance with the selection operation received in the receiving a selection operation, the spotlight information containing at least coordinate information indicating a coordinate at which the object is positioned.

The steps also include displaying a spotlight screen in accordance with the spotlight information generated in the generating spotlight information, the spotlight screen including a spotlight illuminating region for receiving an operation input and a darkened region for receiving a request to cancel the selection operation.

According to the present invention, it becomes possible to accurately receive intention of a player by a simple operation without disturbing a flow of operation on an application such as an operation of a video game.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings:

FIG. 2 is an explanatory drawing an example of storage state of spotlight information;

DETAILED DESCRIPTION OF THE INVENTION

<First Embodiment>

Hereinafter, an example of one embodiment according to the present invention will be described with reference to the appending drawings.

Figure 1:
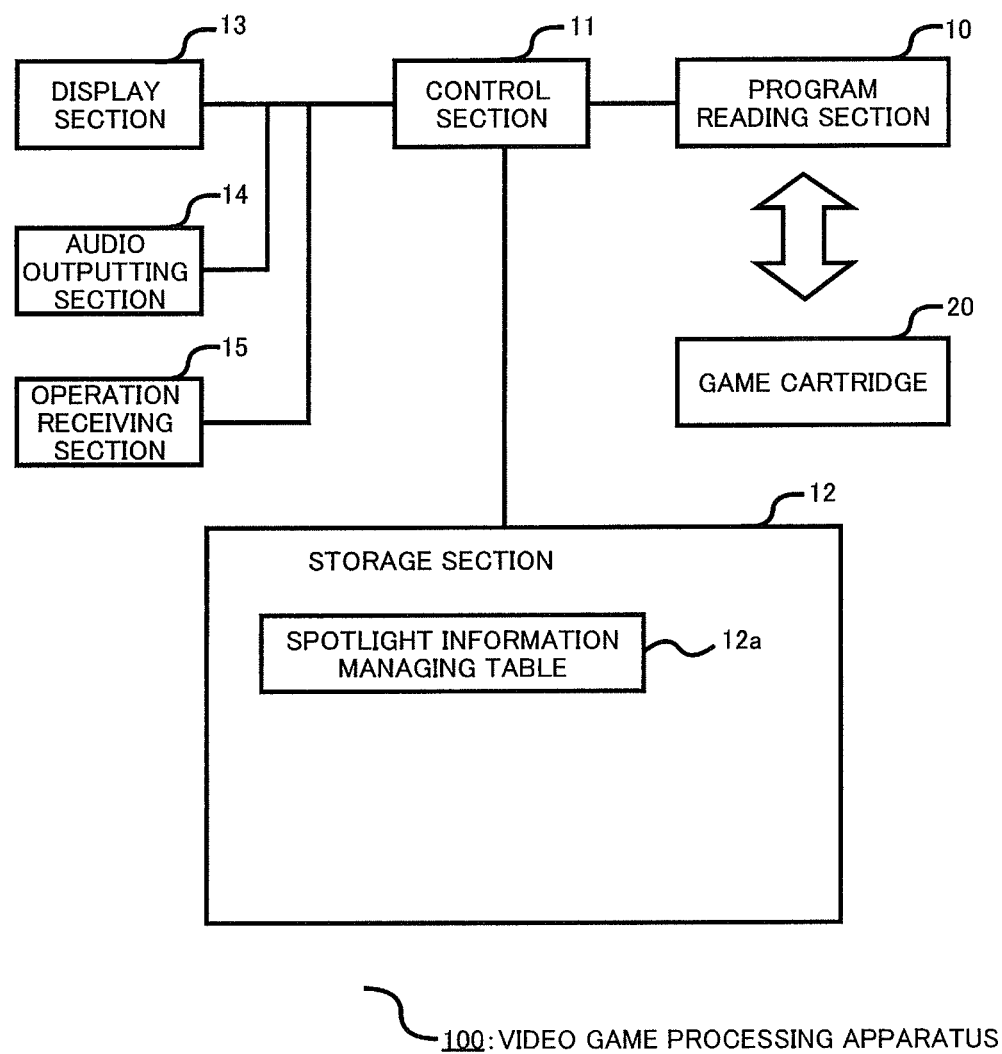
FIG. 1 is a block diagram showing an exemplary configuration of a video game processing apparatus 100 according to one embodiment of the present invention.

FIG. 1 is a block diagram showing an example of a configuration of a video game processing apparatus 100 according to one embodiment of the present invention. As shown in FIG. 1, the video game processing apparatus 100 includes: a program reading section 10; a control section 11; a storage section 12; a display section 13; an audio outputting section 14; and an operation receiving section 15.

The program reading section 10 has a function to read out a necessary video game program from the storage section 12 in which a storage medium for storing various kinds of video game programs therein is embedded. In this regard, in the present embodiment, the program reading section 10 has a mounting section into which the game cartridge 20 for storing the video game program therein is detachably mounted. The program reading section 10 reads out the video game program from the storage medium of the game cartridge 20 mounted into the mounting section by a player (i.e., an operator or a user of the video game processing apparatus 100) to store the read-out video game program in the storage section 12. In this regard, a video game used in the present embodiment and carried out in accordance with the video game program may be a video game such as an RPG, a simulation game, a puzzle game or a battle game, so long as the video game is the one in which a player is requested to select an object.

The control section 11 has a function to carry out game programs read out by the program reading section 10 and stored in the storage section 12 and a function to carry out various kinds of controls to cause the video game to proceed in accordance with operations by the player.

The storage section 12 is a storage medium for storing a video game program required when the video game is caused to proceed and various kinds of data. The storage section 12 is configured by a nonvolatile memory such as a RAM, for example. Various kinds of information to be registered and updated in accordance with progress of the game, and various kinds of information read out from a storage medium embedded in the game cartridge 20 for using the game are stored in the storage section 12.

In this regard, the video game processing apparatus 100 may be configured so that the video game program is downloaded from a game program providing server (not shown in the drawings) via a communication network such as the Internet and is stored in the storage section 12.

In the present embodiment, the storage section 12 includes a spotlight information managing table 12a. Spotlight information is stored in the spotlight information managing table 12a. The spotlight information contains a central coordinate of a spotlight illuminating region specified by a coordinate at which a variety of predetermined objects (in the present embodiment, a player character and an enemy character) are positioned in a virtual space of the video game displayed on the display screen of the display section 13. The spotlight information is referred to when a spotlight screen is generated. In the spotlight screen, a spotlight illuminating region and a darkened region (in the present embodiment, the darkened region is not completely dark, but it is rather dusky so that a field of the region can be seen through) are distinguishably displayed on the game screen.

FIG. 2 is an explanatory drawing showing an example of a storage state of spotlight information stored in the spotlight information managing table 12a. As shown in FIG. 2, the spotlight information is information containing a central coordinate of a spotlight illuminating region, a shape of the spotlight illuminating region (illuminating region shape), a method of determining a darkened region and luminous intensity (the degree of light and dark of the illuminating region and the darkened region on the display screen). In the present embodiment, a description will be provided for an example where a "circle with a radius R" is set to the illuminating region shape. However, the illuminating region shape is not limited to this shape. The illuminating region shape may be other shape such as a polygonal shape, a star shape, and a shape with an inverted silhouette from which an object that becomes an action target is cut out, so long as it is a shape that can get attention of the player and includes a predetermined region so that at least a coordinate at (or in the vicinity of) which the object serving as an action target of the player character is positioned is centered. Further, the spotlight illuminating region is not limited to one closed region, and may be divided into plural parts. In this case, the spotlight information managing table 12a may be configured so that multiple central coordinates are set up therein.

In the present embodiment, an explanation will be provided, for example, where a coordinate of an enemy character serving as a target of an attack action by a player character is used in battle processing (described later) as the central coordinate of the spotlight illuminating region.

The display section 13 is a display device for displaying a game screen in response to operations of the player in accordance with control of the control section 11. The display section 13 is constructed by a liquid crystal display, for example.

The audio outputting section 14 has a function to output audio in response to operations of the player or an action of any character in accordance with control of the control section 11.

The operation receiving section 15 receives operational signals in response to operations of the player, and notifies the control section 11 of its result. In the present embodiment, the operation receiving section 15 receives operations of the player via a touch panel provided in the display section 13. Otherwise, the operation receiving section 15 may be configured so as to receive operations of the player via a controller such as a mouse or a game pad.

Next, an operation of the video game processing apparatus 100 according to the present embodiment will be described.

Figure 3:
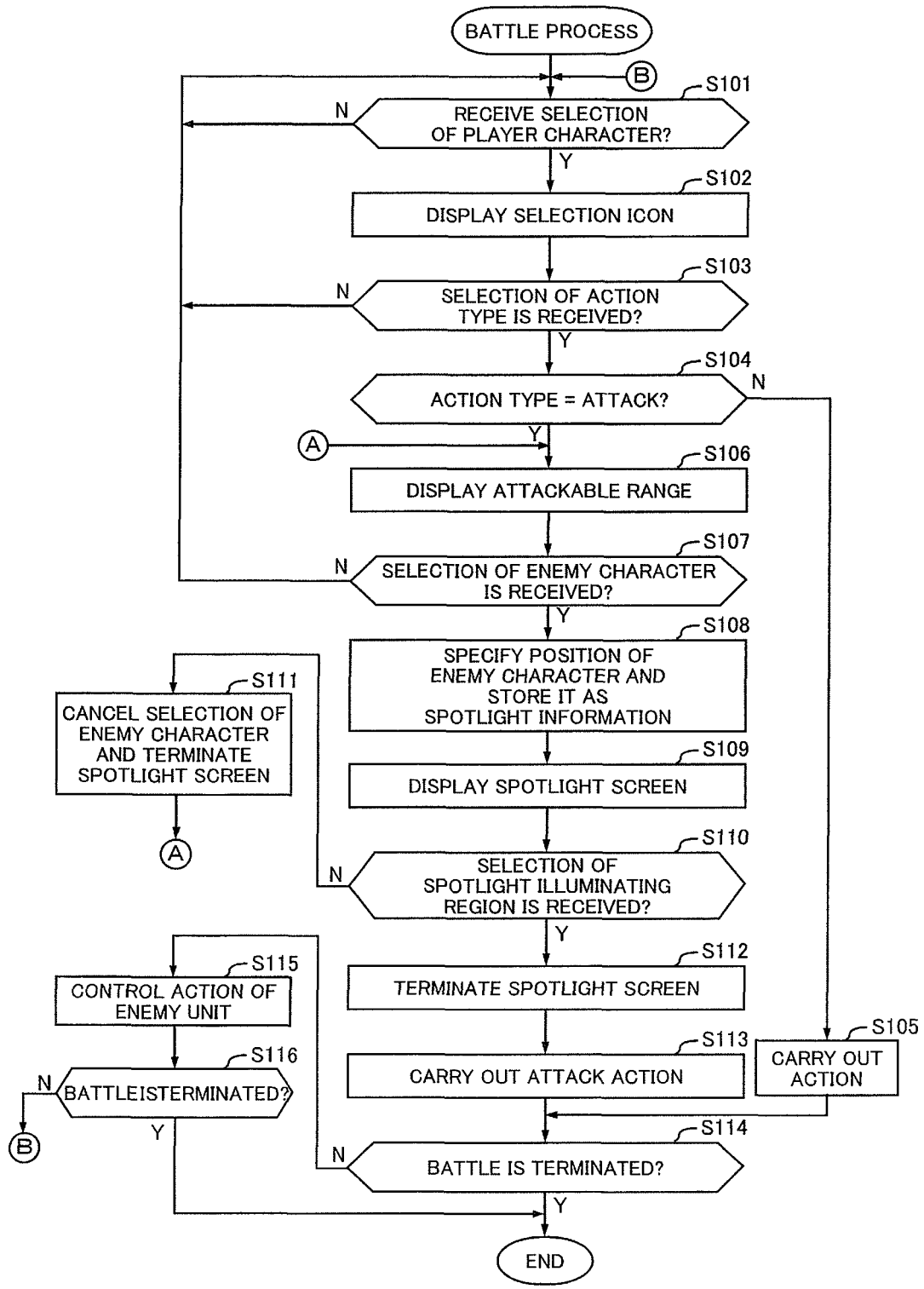
FIG. 3 is a flowchart showing an example of battle processing.

FIG. 3 is a flowchart showing an example of the battle processing carried out by the video game processing apparatus 100. The battle processing is started when requirements for starting a battle between a player character operated by a player P and a non-player character operated by the control section 11 are met in accordance with progress of a video game.

In the present embodiment, an explanation will be provided related to a case where processing for illuminating a predetermined region including an enemy character NP1 with a spotlight and darkening other region is executed when a selection operation for selecting a player character P1 from multiple player characters P1, P2 operated by the player P is received and the another selection operation for selecting the enemy character NP1 as a target of an attack by the player character P1 is received. In this regard, explanation of any action and processing with no relationship to the present invention may be omitted.

In the battle processing, the control section 11 first causes the display section 13 to display a battle screen, and receives a selection of a player character by a player P (Step S101).

Here, a method of battle in the present embodiment will be described.

Figure 4:
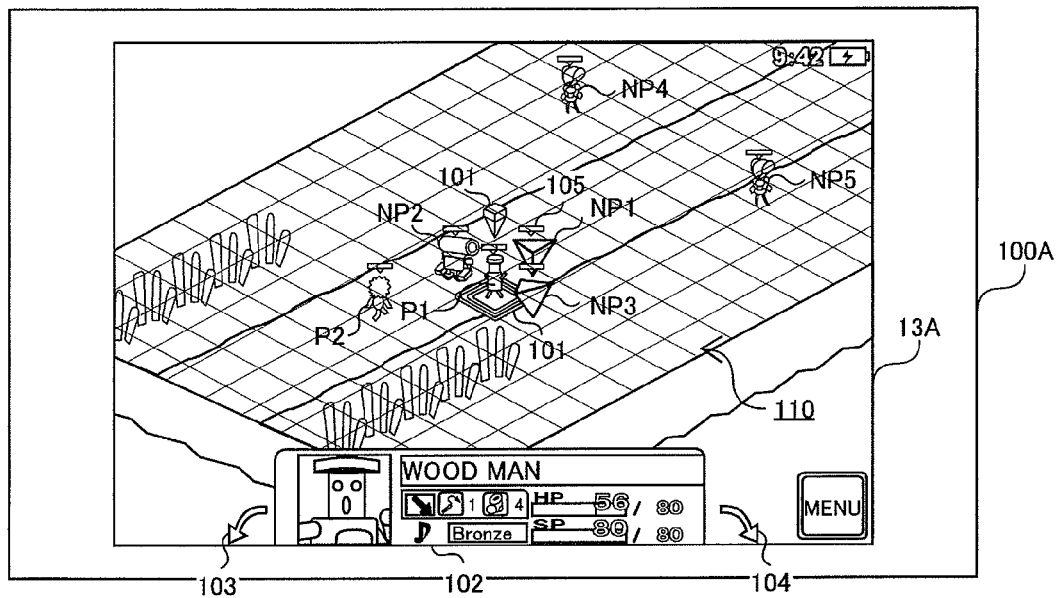
FIG. 4 is an explanatory drawing showing an example of a game screen.

FIG. 4 is an explanatory drawing showing an example of a game screen (battle screen) displayed on the display screen 13A of the display section 13, which is provided on a housing 100A of the video game processing apparatus 100. As shown in FIG. 4, in a battle according to the present embodiment, a battle between a player unit (which is a group of characters who can be operated by the player P, that is the player characters P1, P2 serving as objects) arranged on a battle field 110, which is configured by a plurality of squares, and an enemy unit (which is a group of characters operated by the control section 11, including enemy characters NP1 to NP5 in the present embodiment) is caused to proceed on a turn basis. Otherwise, a single player character and a single enemy character may constitute the player unit and the enemy unit, respectively. Further, in the present embodiment, each character moves on the squares constituting the battle field 110. However, it is configured so that the squares are not displayed on the game screen other than the case where it is necessary for the player P to display the squares on the battle field such as the case of carrying out movement processing of each character.

Further, a status display region 102 in which a status including a HP (hit point) of each character and the like is displayed, and selected character switching buttons 103, 104 capable of switching the selection of a character in turn are provided on the game screen in the present embodiment. The selected character switching buttons 103, 104 are useful in a case where it is hard for the player to accurately select a character in an operation of the touch panel by means of a finger of a human or a pen, for example, in a case where a large number of characters that the player P can select exist on the battle field 110, or in a case where the displayed character is very small. Further, an HP gauge 105 indicating an HP of each character is displayed in the vicinity of each character on the battle field 110. In addition, an icon indicating status abnormality of each character may be displayed in the vicinity of the corresponding character if needed, for example.

When the selection of the player character P1 from the player characters P1, P2, for example, is received by touching (or pressing) a display position of the player character P1 by means of a finger of the player P at Step S101 ("Yes" at Step S101), the control section 11 causes the display section 13 to display an selection icon 101 in the vicinity of the player character P1 (Step S102). In the present embodiment, the selection icon 100 is configured by a portion for highlighting a square at which the selected character is positioned and a portion arranged above the character as shown in FIG. 4, and this makes it possible to improve visibility.

When the selection icon 101 is displayed, the control section 11 receives a selection of an action type (Step S103). Here, in the present embodiment, the control section 11 causes the display section 13 to display an action icon (will be described later) so that the displayed action icon can be selected in a case where the display position of the player character P1 at which the selection icon 101 is displayed is again touched (or pressed) by the player P.

Figure 5:
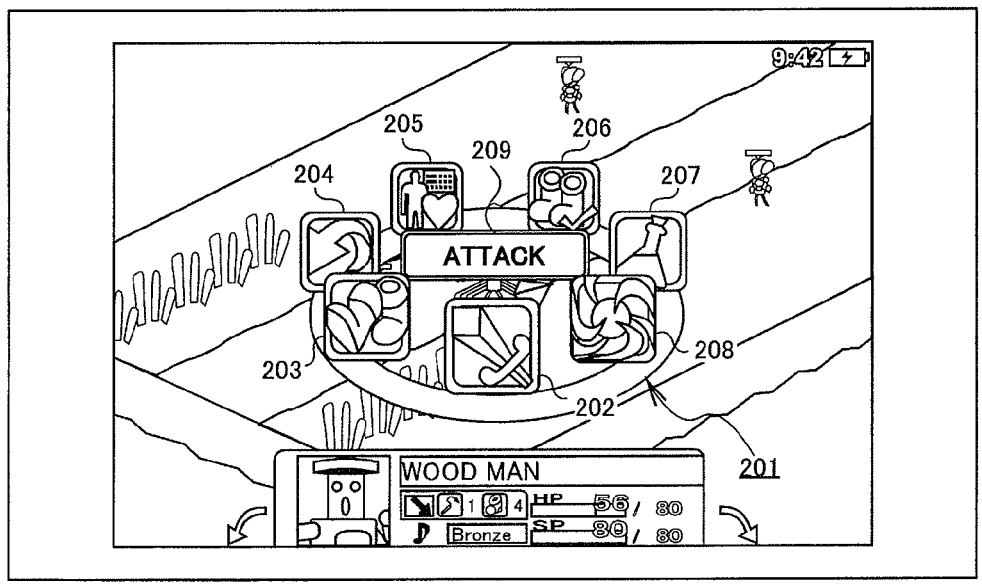
FIG. 5 is an explanatory drawing showing an example of the game screen.

FIG. 5 is an explanatory drawing showing an example of the game screen at this time. As shown in FIG. 5, an action icon 201 includes action type icons 202 to 208 each indicating an action type to be caused the character to carry out. When the player P selects one from the action type icons 202 to 208, the control section 11 arranges the selected action type icon at lower central side of the action icon 201 (that is, a position of the action type icon 202 in FIG. 5) by rotationally moving a display position of the respective action type icons 202 to 208, and causes the display section 13 to display action content indicated by the arranged action type icon in an action content display region 209.

When a selection of the action type icon whose action content is displayed in the action content display region 209 is received, the control section 11 determines that the selection of an action type is received ("Yes" at Step S103), and erases the action icon 201. The control section 11 then determines whether an action type of the selected action type icon is an attack action or not (Step S104). Here, in a case where it is determined that the action type of the selected action type icon is not an attack action ("No" at Step S104), the control section 11 carries out processing for carrying out an action indicated by the selected action type icon (Step S105), causes the processing flow to proceed to Step S114 (will be described later).

On the other hand, in a case where a portion other than the action icon 201 on the game screen is touched (or pressed), the control section 11 determines that a selection of the action type has not been received ("No" at Step S103), and erases the action icon 201. The control section 11 then cancels the selection of the player character P1, and causes the processing flow to return to Step S101. In addition, when the selection of the player character P1 is canceled, the control section 11 causes the display section 13 to erase the selection icon 101.

In a case where it is determined that the selection of the attack action is received ("Yes" at Step S104), the control section 11 refers to character information stored in the storage section 12, and causes the display section 13 to display an attackable range of the player character P1 (Step S106).

Figure 6:
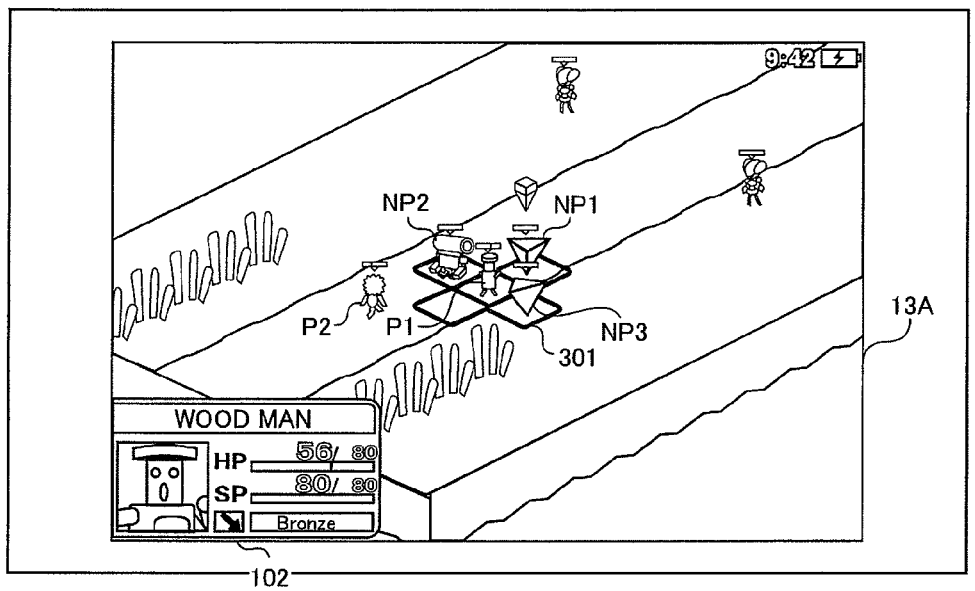
FIG. 6 is an explanatory drawing showing an example of the game screen.

FIG. 6 is an explanatory drawing showing an example of the game screen at this time. As shown in FIG. 6, the control section 11 identifiably displays an attackable square 301 indicating an attackable range of the player character P1. Further, the control section 11 causes the display position of the status display region 102 to move to a lower left side of the game screen at this time. In this case, it may be configured so that options (for example, a normal attack, a special attack and the like) of the attack action of the player character P1 are displayed on the game screen to allow the player to select one of the options.

Next, the control section 11 receives a selection of an enemy character (Step S107). At this time, when the control section 11 receives touch on a predetermined region of the game screen other than the enemy characters NP1 to NP3 that are positioned within an attack range, the control section 11 determines that the selection of any enemy character is not received ("No" at Step S107). The control section 11 then erases the attackable square 301, and cancels the selection of the player character P1. The control section 11 causes the processing flow to return to Step S101. Otherwise, it may be configured so that the selection of the player character P1 is not canceled in this case and the processing flow is caused to return to Step S103.

On the other hand, when the selection of the enemy character NP1, for example, from the enemy characters NP1 to NP3 is received ("Yes" at Step S107), the control section 11 stores (or overwrites) positional information of the enemy character NP1 (for example, a coordinate at which the enemy character NP1 is positioned on the game screen) in the spotlight information managing table 12*a* as the central coordinate in the spotlight information (Step S108). In this regard, the video game processing apparatus 100 may be configured so that plural numbers of the enemy characters can be selected from the enemy characters NP1 to NP3. In this case, it may be configured so that the center position of the plural enemy characters for which the selection operations are received is determined as the central coordinate in the spotlight information, for example.

When the central coordinate is stored in the spotlight information, the control section 11 arranges the enemy character NP1 at the center of the game screen (centering process) by matching the center of the game screen displayed on the display screen 13A of the display section 13 with the central coordinate stored in the spotlight information, and causes the display section 13 to display the spotlight screen including the spotlight illuminating region in which the enemy character NP1 is centered (Step S109).

Figure 7:
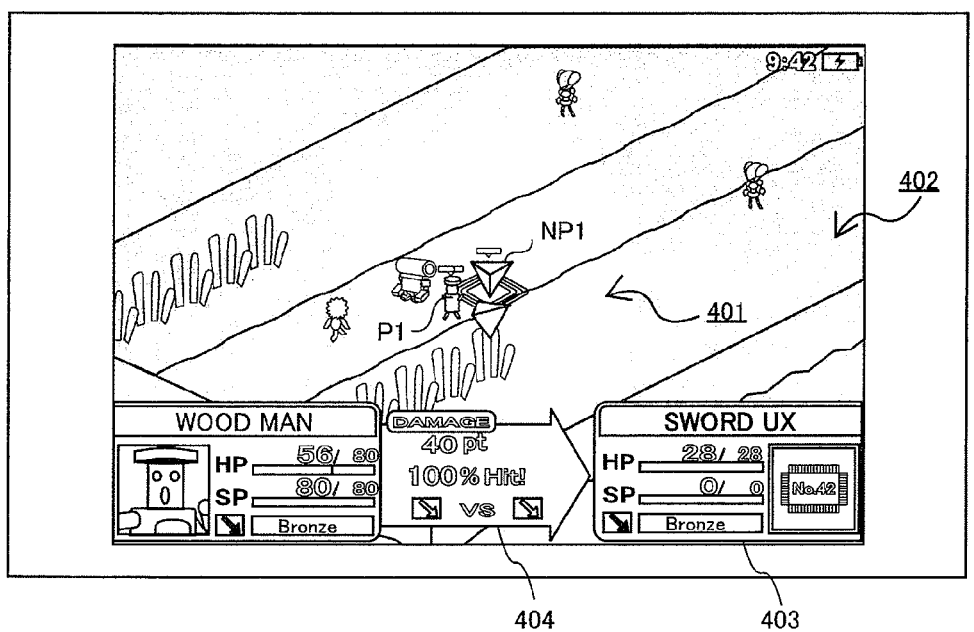
FIG. 7 is an explanatory drawing showing an example of the game screen.

FIG. 7 is an explanatory drawing showing an example of a spotlight screen when an enemy character NP1 is selected. As shown in FIG. 7, the spotlight screen includes a spotlight illuminating region 401 having a circular shape with a radius R, a darkened region 402, an attack target character status display region 403 and a damage estimate display region 404. The darkened region 402 is displayed so as to occupy the game screen other than the spotlight illuminating region 401 in accordance with the method of determining a darkened region in the spotlight information. The damage estimate display region 404 indicates an estimate value of damage given to the enemy character NP1 by means of the attack of the player character P1. When the spotlight screen is displayed, the control section 11 refers to the spotlight information to determine a shape, a size, luminous intensity and the like of each of the spotlight illuminating region 401 and the darkened region 402 (see FIG. 2).

When the spotlight screen is displayed, the control section 11 determines whether a selection of the spotlight illuminating region 401 is received or not (Step S110). Here, in a case where it is determined that a selection of the darkened region 402 is received, the control section 11 determines that the selection of the spotlight illuminating region 401 has not been received (that is, the control section 11 determines that it is equivalent to a case where "NO" in a determination dialog box is selected) ("No" at Step S110). The control section 11 then cancels the selection of the enemy character NP1 (Step S111), and causes the processing flow to return to Step S106.

On the other hand, in a case where it is determined that the selection of the spotlight illuminating region 401 is received by receiving the selection of the spotlight illuminating region 401 (that is, the control section 11 determines that it is equivalent to a case where "YES" in a determination dialog box is selected) ("Yes" at Step S110), the control section 11 terminates the spotlight screen (Step S112), and executes processing to carry out the attack action (Step S113). In this regard, processing to reproduce an animation of the player character P1 and the enemy character NP1, processing to carry out damage determination and the like are executed as the processing to carry out an attack action.

When an attack action by the player character P1 or other action is carried out, the control section 11 determines whether a battle terminating condition is met or not (Step S114). In the present embodiment, a predetermined victory condition (for example, "an enemy unit is annihilated", "an HP of a specific enemy character becomes zero" or the like) stored in the storage section 12 or a defeat condition (for example, "annihilation of a player unit" or "the victory condition is not met within a predetermined number of turns" or the like) is met, the control section 11 determines that the battle terminating condition is met ("Yes" at Step S114) and terminates the battle processing herein.

On the other hand, in a case where it is determined that the battle terminating condition is not met on the basis of a result of the attack action by the player character P1 ("No" at Step S114), the control section 11 controls an action of the enemy unit in accordance with the control program stored in the storage section 12 (Step S115), and, as a result, determines whether a battle terminating condition is met or not (Step S116). Here, in a case where it is determined that the battle terminating condition is met ("Yes" at Step S114), the control section 11 terminates the battle processing herein. On the other hand, in a case where it is determined that the battle terminating condition is not met ("No" at Step S114), the control section 11 causes the processing flow to return to Step S101.

As explained above, in the embodiment described above, the video game processing apparatus 100 for controlling the progress of the video game is configured so that: a selection operation of an object that becomes an action target of a player character in the video game (for example, the enemy character NP1 that becomes an attack target of the player character P1) is received; spotlight information (for example, the spotlight information in which the positional information of the enemy character NP1 is set as the central coordinate) containing at least coordinate information indicating a coordinate at which the object is positioned is generated in accordance with the received selection operation; and the spotlight screen, which includes the spotlight illuminating region 401 for receiving an operation input and the darkened region 402 for receiving a request to cancel a selection operation (for example, the selection operation of the enemy character NP1), is displayed in accordance with the generated spotlight information. Therefore, it becomes possible to accurately receive intention of a player by a simple operation without disturbing an operation flow of an application such as an operation of a video game.

Namely, since the region including the selected object as a target of an action of the player character operated by the player is displayed so as to be illuminated with spotlight, it is easy for the player to confirm whether the intended object is selected or not. Further, confirmation of the selection operation of the enemy character is received in the spotlight illuminating region. Therefore, it is possible to avoid displaying a dialog box or the like for confirming intention of the player, and it becomes possible to prevent a flow of the video game from being disturbed.

Further, in the embodiment described above, the video game processing apparatus 100 is configured so as to determine the received selection operation in a case where the selection of the spotlight illuminating region 401 is received (for example, display of the spotlight screen is terminated, and the attack action is carried out). This makes it possible to prevent the player from making an operational mistake.

Further, in the embodiment described above, the video game processing apparatus 100 is configured so that the selection operation is received in accordance with the contact position of the touch panel. This makes it possible to provide more intuitive operability. Namely, for example, in a video game in which the video game is caused to proceed by operating an object such as a character displayed on the game screen by means of a touch operation of a finger or pen to the corresponding region, the operation input is received in a given region on the display screen (for example, the spotlight illuminating region 401), and the input to cancel the operation is received in other region (for example, the darkened region 402). Therefore, even in a case where a portion for receiving an operation on the touch panel is smaller than a width of the finger or pen, it is possible to accurately receive the intention of the player.

Further, in the embodiment described above, the video game processing apparatus 100 is configured so that a predetermined region (for example, a region of a circular shape with a radius R set up as the illuminating region shape) with its center at the coordinate at which the object (for example, the enemy character NP1) is positioned determined as the spotlight illuminating region 401. Therefore, it becomes possible to request a selection operation of the player on the game screen along with flow of the video game.

Furthermore, in the embodiment described above, the video game processing apparatus 100 is configured so that the enemy character NP1 is arranged at the center of the game screen displayed on the display screen 13A of the display section 13 (that is, the video game processing apparatus 100 is configured so that the object for which the player P is required to confirm the determination is centered). This makes it possible to improve an effect such as dramatic effects when the spotlight is illuminated on the enemy character NP1. Further, since the object (target object) that becomes a selection target is clearly specified, it becomes possible to draw the player's attention to the object. In addition, it may be configured so that, when the centering is carried out, an animation to illuminate the spotlight is displayed or an effect to gradually squeeze a size of the spotlight illuminating region 401 with respect to the centered object is displayed.

<Second Embodiment>

In a second embodiment, the spotlight illuminating region and the darkened region can also be determined in view of a position of any object other than the player character P1 and the enemy character NP1. Namely, unlike a case in the first embodiment, the spotlight information generating processing is executed in view of the other object or objects than the enemy character NP1 selected as the action target of the player character P1.

Figure 8:
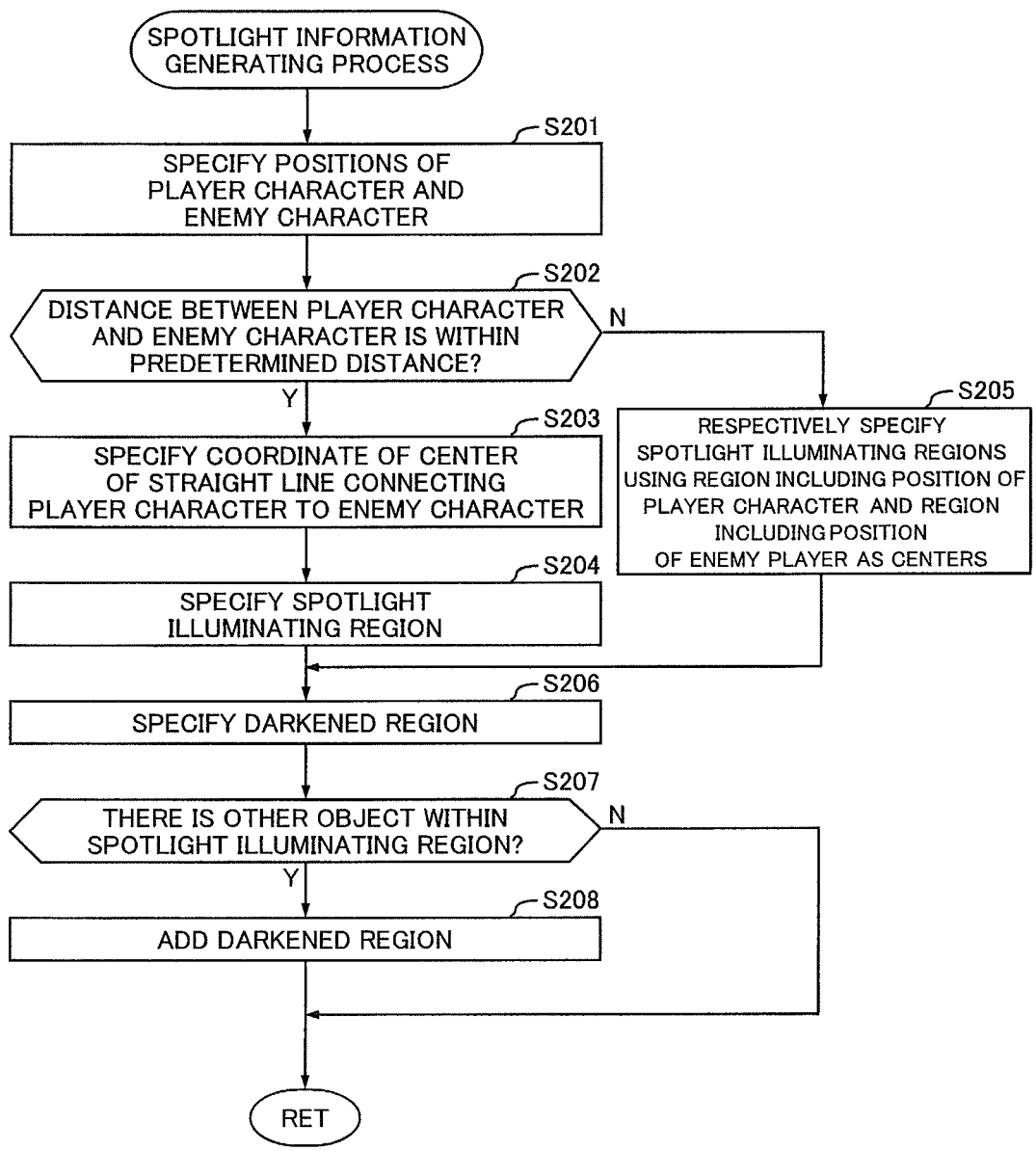
FIG. 8 is a flowchart showing an example of spotlight information generating processing.

FIG. 8 is a flowchart showing an example of spotlight information generating processing carried out by the video game processing apparatus 100. Here, a description will be provided related to a case where spotlight information generating processing is carried out in place of Step S108 in the battle processing described above (see FIG. 3). In this regard, explanations of any actions and processing with no relationship to the present invention may be omitted.

In the spotlight information generating processing, the control section 11 first specifies a position of each of the player character P1 and the enemy character NP1 (Step S201).

Subsequently, the control section 11 determines whether a distance between the player character P1 and the enemy character NP1 on the game screen displayed on the display screen 13A of the display section 13 is within a predetermined distance stored in the storage section 12 or not (Step S202).

In a case where it is determined that the distance between the player character P1 and the enemy character NP1 is within the predetermined distance ("Yes" at Step S202), the control section 11 specifies a coordinate of the center of a straight line connecting the player character P1 to the enemy character NP1 (Step S203), and stores the specified coordinate in the spotlight information managing table 12a as a central coordinate.

When the central coordinate is stored, the control section 11 specifies a predetermined region including the player character P1 and the enemy character NP1 as the spotlight illuminating region with the central coordinate being at a center thereof (Step S204). The predetermined region may have, for example, an ellipsoidal shape with the positions of the player character P1 and the enemy character NP1 being used as two foci thereof. In this regard, the shape of the spotlight illuminating region is not limited to a circular shape and any shape may be used so long as the spotlight illuminating region includes the player character P1 and the enemy character NP1. Namely, it may be configured so that a form of a spotlight (including a shape and a color) is determined in accordance with a progress status of the video game, characteristics of characters and the like, for example.

On the other hand, in a case where it is determined that the distance between the player character P1 and the enemy character NP1 exceeds the predetermined distance stored in the storage section 12 ("No" at Step S202), the control section 11 respectively stores the position of the player character P1 and the position of the enemy character NP1 as the central coordinates in the spotlight information managing table 12a, and respectively specifies, as the spotlight illuminating regions, a circular region having a radius R1 with its center at the position of the player character P1 and a circular region having a radius R2 with its center at the position of the enemy character NP1 (Step S205).

When the spotlight illuminating region is specified, the control section 11 specifies the darkened region in accordance with the spotlight information (Step S206).

Here, in the spotlight information generating processing in the present embodiment, the control section 11 determines whether there is any other object or objects (in the present embodiment, characters other than the player character P1 and the enemy character NP1) within the spotlight illuminating region or not (Step S207). In a case where it is determined that there is no other object within the spotlight illuminating region, the control section 11 terminates the spotlight information generating processing, and causes the processing flow to return to Step S109 in the battle processing (see FIG. 3).

On the other hand, in a case where it is determined that there is the other object within the spotlight illuminating region ("Yes" at Step S207), the control section 11 adds another predetermined region to the spotlight information of the spotlight information managing table 12a as the darkened region (Step S208). The predetermined region to be added is determined so as to have its center at a position where the other object is positioned within the spotlight illuminating region (for example, a region with a shape obtained by slightly enlarging an outline of the other object). When the darkened region is added, the control section 11 terminates the spotlight information generating processing, and causes the processing flow to return to Step S109 in the battle processing (see FIG. 3).

In this regard, the darkened region thus added herein has a main purpose to assist clear display of a selection target by means of spotlight. Accordingly, the video game processing apparatus 100 may be configured so that the control section 11 does not cancel the selection of the enemy character NP1 even if a portion of the darkened region added on the game screen is selected by the player P.

As described above, in the present embodiment, the video game processing apparatus 100 is configured so that the central coordinate between the player character P1 and the object for which the selection operation is received (for example, the enemy character NP1) in the virtual space of the video game is specified, and a predetermined region (for example, an ellipsoidal shape in which the positions at which the player character P1 and the enemy character NP1 are respectively positioned are used as two foci) including the player character P1 and the object (for example, the enemy character NP1) is determined as the spotlight illuminating region using the specified central coordinate as the center. This makes it possible to cause the player to easily recognize the player character which carries out an action in the video game and the object that becomes a target of the action.

Further, in the present embodiment, the video game processing apparatus 100 may be configured so that, in a case where the player character P1 is away from the object for which the selection operation is received (for example, the enemy character NP1) by more than a predetermined distance, each of the predetermined region including the coordinate at which the player character P1 is positioned (for example, the circular region having the radius R1 with its center at which the player character P1 is positioned) and the predetermined region including the coordinate at which the object is positioned (for example, the circular region having the radius R2 with its center at which the enemy character NP1 is positioned) is determined as the spotlight illuminating region. Therefore, it becomes possible to prevent the spotlight illuminating region from becoming too large to cause the effect of drawing the player's attention.

Further, in the present embodiment, the video game processing apparatus 100 is configured so that, in a case where any object for which the selection operation is not received (for example, the enemy characters NP2, NP3) exists within the spotlight illuminating region, the predetermined region including the coordinate at which the object (for example, the enemy characters NP2, NP3) exists (for example, the region with the shape obtained by slightly enlarging an outline of the enemy characters NP2, NP3) is determined as the darkened region. Therefore, it becomes possible to clearly present an action target object to the player even in a case where a large number of objects exist in a small area.

In addition, although the video game processing apparatus 100 has been explained as an example in each of the embodiments described above, the present invention may be applied to any device so long as it is a device that carries out a user interface processing using an input device such as a touch panel. Therefore, the similar processing to those in each of the embodiments described above may also be carried out for user interface processing regarding an operation of an object (a user interface element) in other application than a video game.

Namely, a device for controlling an application may be configured so as to: receive an operation for selecting an object; generate spotlight information containing coordinate information at which at least the object is positioned in accordance with the received selection operation; and displays a spotlight screen including a spotlight illuminating region for receiving an operation input and a darkened region for receiving a request to cancel a selection operation in accordance with the generated spotlight information. By configuring it in this manner, it becomes possible to accurately receive intention of the player by a simple operation without disturbing a flow of operation on the application.

Industrial Applicability

According to the present invention, it is useful to accurately receive intention of a player by a simple operation in a compact handheld device with a small area in which operation buttons are provided without disturbing a flow of operation on an application such as an operation of a video game. Further, the present invention can be applied to a normal console game machine.

What is claimed is:

1. A user interface processing apparatus, comprising:
an attack action selecting operation receiver that receives an action selection operation for selecting an attack action of a player character in a video game, the attack action being an attack that is executable on an attack target character by the player character in the video game;
an attack target selecting operation receiver that receives a target selection operation for selecting the attack target character of the player character in the video game;
a spotlight information generator that generates spotlight information in accordance with the attack target character and the attack action after the attack target selecting operation receiver receives the target selection operation and the attack action selecting operation receiver receives the action selection operation, the spotlight information containing at least coordinate information indicating a coordinate at which the attack target character is positioned;
a spotlight screen display controller that displays a spotlight screen in accordance with the spotlight information generated by the spotlight information generator, the spotlight screen including a spotlight illuminating region for receiving an operation input and a darkened region for receiving a request to cancel the target selection operation; and
a selection determiner that determines whether one of the spotlight illuminating region and the darkened region is selected,
wherein, when the selection determiner determines that the spotlight illuminating region is selected, the attack action is confirmed and executed on the attack target character,
when the selection determiner determines that the darkened region is selected, the target selection operation is cancelled,
the spotlight illuminating region includes at least one area that encircles the attack target character and the player character, the at least one area, including the encircled player character, being selectable for confirming and executing the attack action on the attack target character,
the darkened region includes an area other than the spotlight illuminating region, and
the spotlight illuminating region has a higher luminous intensity than the darkened region.

2. The user interface processing apparatus according to claim 1, wherein options for the attack action are displayed when the spotlight screen is displayed.

3. The user interface processing apparatus according to claim 1, wherein the attack target selecting operation receiver receives the target selection operation in accordance with a contact position on a touch panel.

4. The user interface processing apparatus according to claim 1, wherein the spotlight information generator determines a predetermined region, a center of which is the coordinate at which the attack target character is positioned, as the spotlight illuminating region.

5. The user interface processing apparatus according to claim 1, wherein, when there is an other object, for which the target selection operation is not received, in the spotlight illuminating region, the spotlight information generator determines a predetermined region, including an other coordinate at which the other object exists, as the darkened region.

6. The user interface processing apparatus according to claim 1, wherein the user interface processing apparatus is a video game processing apparatus for controlling progress of a video game.

7. The user interface processing apparatus according to claim 6, wherein the spotlight information generator includes a central coordinate specifier that specifies a central coordinate between the player character and the attack target character for which the target selection operation is received by the attack target selecting operation receiver in a virtual space of the video game, and
wherein the spotlight information generator determines a predetermined region including the player character and the attack target character as the spotlight illuminating region using the central coordinate specified by the central coordinate specifier.

8. The user interface processing apparatus according to claim 6, wherein, when the player character is separated from the attack target character for which the target selection operation is received by the attack target selecting operation receiver by more than a predetermined distance, the spotlight information generator determines each of a second predetermined region including a second coordinate at which the player character is positioned and a first predetermined region including the coordinate at which the attack target character is positioned as the spotlight illuminating region.

9. The user interface processing apparatus according to claim 1, further comprising:
a player selecting operation receiver that receives a player selection operation for selecting the player character that executes the attack action on the attack target character in the video game.

10. The user interface processing apparatus according to claim 9, further comprising:
an attackable character display controller that identifiably displays an attackable area indicating an attackable range of the player character when the player selection operation and the action selection operation are received, the attack target character being in the attackable area.

11. The user interface processing apparatus according to claim 10, wherein
the attackable character display controller erases the attackable area when a selection of an enemy character that is not in the attackable area is received, and
the coordinate at which the attack target character is positioned is stored as the coordinate information when the target selection operation that selects the attack target character is received.

12. The user interface processing apparatus according to claim 10, wherein the spotlight screen display controller displays the spotlight screen without disturbing a flow of operation of the video game.

13. A user interface processing method, comprising:
receiving an action selection operation for selecting an attack action of a player character in a video game, the attack action being an attack that is executable on an attack target character by the player character in the video game;
receiving a target selection operation for selecting the attack target character of the player character in the video game;
generating, with a controller, spotlight information in accordance with the attack target character and the attack action after the receiving of the target selection operation and the receiving of the action selection operation, the spotlight information containing at least coordinate information indicating a coordinate at which the attack target character is positioned, the coordinate information being stored in a memory;
displaying, on a display and based on the coordinate information stored in the memory, a spotlight screen in accordance with the spotlight information, the spotlight screen including a spotlight illuminating region for receiving an operation input and a darkened region for receiving a request to cancel the target selection operation; and determining, with the controller, whether one of the spotlight illuminating region and the darkened region is selected, wherein, when the spotlight illuminating region is determined as being selected in the determining, the attack action is confirmed and executed on the attack target character, and when the darkened region is determined as being selected in the determining, the target selection operation is cancelled, the spotlight illuminating region includes at least one area that encircles the attack target character and the player character, the at least one area, including the encircled player character being selectable for confirming and executing the attack action on the attack target character, the darkened region includes an area other than the spotlight illuminating region, and the spotlight illuminating region has a higher luminous intensity than the darkened region.

14. The user interface processing method according to claim 13, further comprising:

receiving a player selection operation for selecting the player character that executes the attack action on the attack target character in the video game.

15. The user interface processing method according to claim 14, further comprising:

identifiably displaying an attackable area indicating an attackable range of the player character when the player selection operation and the action selection operation are received, the attack target character being in the attackable area.

16. The user interface processing method according to claim 15, further comprising:

erasing the attackable area when a selection of an enemy character that is not in the attackable area is received, and storing the coordinate at which the attack target character is positioned as the coordinate information when the target selection operation that selects the attack target character is received.

17. A non-transitory computer-readable medium including a computer program product for processing a user interface, the computer program product causing a computer to execute:

receiving an action selection operation for selecting an attack action of a player character in a video game, the attack action being an attack that is executable on an attack target character by the player character in the video game;

receiving a target selection operation for selecting the attack target character of the player character in the video game;

generating spotlight information in accordance with the attack target character and the attack action after the receiving of the target selection operation and the receiving of the action selection operation, the spotlight information containing at least coordinate information indicating a coordinate at which the attack target character is positioned;

displaying a spotlight screen in accordance with the spotlight information, the spotlight screen including a spotlight illuminating region for receiving an operation input and a darkened region for receiving a request to cancel the target selection operation; and determining whether one of the spotlight illuminating region and the darkened region is selected, wherein, when the spotlight illuminating region is determined as being selected in the determining, the attack action is confirmed and executed on the attack target character, and when the darkened region is determined as being selected in the determining, the target selection operation of the object is cancelled, the spotlight illuminating region includes at least one area that encircles the attack target character and the player character, the at least one area, including the encircled player character being selectable for confirming and executing the attack action on the attack target character, the darkened region includes an area other than the spotlight illuminating region, and the spotlight illuminating region has a higher luminous intensity than the darkened region.

18. The non-transitory computer-readable medium according to claim 17, further comprising:

receiving a player selection operation for selecting the player character that executes the attack action on the attack target character in the video game.

19. The non-transitory computer-readable medium according to claim 18, further comprising:

identifiably displaying an attackable area indicating an attackable range of the player character when the player selection operation and the action selection operation are received, the attack target character being in the attackable area.

20. The non-transitory computer-readable medium according to claim 19, further comprising:

erasing the attackable area when a selection of an enemy character that is not in the attackable area is received, and storing the coordinate at which the attack target character is positioned as the coordinate information when the target selection operation that selects the attack target character is received.

\* \* \* \* \*